United States Patent
Lane et al.

(10) Patent No.: US 6,599,965 B2
(45) Date of Patent: Jul. 29, 2003

(54) COATING COMPOSITION FOR METALLIC SUBSTRATES

(75) Inventors: Matthew T. Lane, Bowling Green, OH (US); David L. Newton, Toledo, OH (US)

(73) Assignee: BASF Corporation, Southfield, MI (US)

( * ) Notice: Subject to any disclaimer, the term of this patent is extended or adjusted under 35 U.S.C. 154(b) by 0 days.

(21) Appl. No.: 09/747,854

(22) Filed: Dec. 22, 2000

(65) Prior Publication Data

US 2002/0006996 A1 Jan. 17, 2002

Related U.S. Application Data

(63) Continuation-in-part of application No. 09/599,693, filed on Jun. 22, 2000, and a continuation-in-part of application No. 09/599,695, filed on Jun. 22, 2000.

(51) Int. Cl.$^7$ .............................. C08K 5/52; C08K 3/08
(52) U.S. Cl. ........................................ 524/140; 524/439
(58) Field of Search ................................. 524/140, 439

(56) References Cited

U.S. PATENT DOCUMENTS 5,156,677 A * 10/1992 Carpenter .................. 106/404

* cited by examiner

Primary Examiner—Kriellion A. Sanders
(74) Attorney, Agent, or Firm—Mary E. Golota

(57) ABSTRACT

The invention provides a coating composition for use with metallic substrates that provides a unique balance of required properties. In particular, the coating composition of the invention simultaneously provides desirable levels of adhesion to metal, sandability without the production of harmful dust, corrosion resistance, and recoatability. The coating composition of the invention comprises a polyurethane or epoxy/amine film-forming component, and a corrosion protection component consisting of aluminum selected from the group consisting of nonleafing aluminum pigments, the corrosion protection component being present in the composition in an amount effective to prevent corrosion of the substrate. A cured film of the coating applied to a steel substrate has a pass rating after 480 hours in salt spray per ASTM B117.

12 Claims, No Drawings

COATING COMPOSITION FOR METALLIC SUBSTRATES

FIELD OF THE INVENTION

This application is a continuation in part, claiming priority upon U.S. Ser. No. 09/599,693 filed Jun. 22, 2000, and a continuation-in part of application Ser. No. 09/599,695, filed Jun. 22, 2000. The invention relates to coating compositions for use with metallic substrates and more particularly to automotive refinish coating compositions intended for use on metallic substrates, and especially to two component polyurethane primers which can be sanded and recoated and are intended for use on steel substrates.

BACKGROUND OF THE INVENTION

As used herein, "automotive refinish" refers to compositions and processes used in the repair of a damaged automotive finish, usually an OEM provided finish. Refinish operations may involve the repair of one or more outer coating layers, the repair or replacement of entire automotive body components, or a combination of both. The terms "refinish coating" or "repair coating" may be used interchangeably.

Automotive refinishers must be prepared to paint a wide variety of materials. Examples of commonly encountered materials are one or more previously applied coatings, plastic substrates such as RIM, SMC and the like, and metal substrates such as aluminum, galvanized steel, and cold rolled steel. Bare metal and plastic substrates are often exposed as a result of the removal of the previously applied coating layers containing and/or surrounding the defect area. However, it is often difficult to obtain adequate adhesion of refinish coatings applied directly to exposed bare substrates.

Among the many factors influencing the degree of refinish coating/substrate adhesion are the type of exposed substrate, the presence or absence of adhesion promoting pretreatments and/or primers, the size of the exposed area to be repaired, and whether previously applied "anchoring" coating layers surround the exposed repair area.

For example, refinish adhesion is particularly challenging when the exposed substrate is a bare metal such as galvanized iron or steel, aluminum or cold rolled steel. It is especially hard to obtain adequate refinish adhesion to galvanized iron. "Galvanized iron or steel" as used herein refers to iron or steel coated with zinc. "Steel" as used herein refers to alloys of iron with carbon or metals such as manganese, nickel, copper, chromium, molybdenum, vanadium, tungsten and cobalt.

Refinish operations have traditionally used adhesion pretreatments to overcome the adhesion problems associated with the coating of bare metal substrates. Pretreatment as used herein may refer to either mechanical or chemical alterations of the bare metal substrate. Mechanical alterations used to obtain improved adhesion include sanding, scuffing, and the like. Chemical alterations include treatment of the substrate with compositions such as chromic acid conversion coatings, acid etch primers and the like.

Although such pretreatments have obtained improved refinish adhesion, they are undesirable for a number of reasons. Most importantly, pretreatments are inefficient and expensive to apply in terms of material, time, and/or labor costs. Some chemical pretreatments also present industrial hygiene and disposal issues. Finally, the use of some pretreatments such as acid etch primers may contribute to water sensitivity and/or coating failure under test conditions of extreme humidity.

Accordingly, it is highly desirable to eliminate the need for substrate pretreatment as regards the refinish coating of bare metal substrates.

In addition, adhesion to bare metal substrates is improved when the defect area to be repaired is relatively small and is surrounded by previously applied coating layers. Such previously applied coating layers act as an 'adhesion anchor' to the refinish coating. However, many refinish repairs are of a size such that they lack any surrounding adhesion anchors. Moreover, such anchoring adhesion may be completely absent when replacement body parts are painted with a refinish coating.

Finally, improvements in refinish adhesion to bare exposed metal substrates must not be obtained at the expense of traditional refinish coating properties. Such properties include sandability, recoatability, corrosion resistance, durability, ambient or low temperature cure, application parameters such as pot life, sprayability, and clean up, and appearance. Performance properties such as sandability, recoatability and corrosion resistance are particularly important for coating compositions intended for use as primers over steel substrates.

However, it has been difficult for the prior art to obtain the proper balance with regard to sandability, recoatability, corrosion resistance, and metal adhesion requirements.

Failure to provide adequate corrosion resistance or salt spray resistance typically manifests as "scribe creep". "Scribe creep" refers to the degree of corrosion and/or loss of adhesion which occurs along and underneath film adjacent to a scribe made in a cured film after the scribed film has been placed in a salt spray test apparatus. The scribe generally extends down through the film to the underlying metal substrate. As used herein, both 'corrosion resistance' and 'salt spray resistance' refer to the ability of a cured film to stop the progression of corrosion and/or loss of adhesion along a scribe line placed in a salt spray test apparatus for a specified time. Cured films that fail to provide adequate salt spray resistance are vulnerable to large scale film damage and/or loss of adhesion as a result of small or initially minor chips, cuts and scratches to the film and subsequent exposure to outdoor weathering elements.

Although urethane coatings have been known to be useful as refinish primers, they have not achieved the desired balance of properties.

In particular, for polyurethane films to provide desirable salt spray resistance, they have typically relied upon the use of corrosion protection components containing heavy metal pigments such as strontium chromate, lead silica chromate, and the like. Unfortunately, sanding such a film produces dust that is environmentally disfavored due to the presence of the heavy metal containing pigments. Since sanding is a necessity for automotive refinish primers, this disadvantage can render the coating unusable in most commercial refinish application facilities. Accordingly, it would be advantageous to provide a coating which can provide adequate salt spray resistance but which is substantially free of any heavy metal containing pigments.

Aluminum pigments have traditionally been used to provide a desirable metallic or lustrous appearance. For example, the 1977 Federation Series on Coatings Technology teaches that aluminum pigment containing paints have no specific anti-corrosive effect, such as is afforded by rust-inhibitive pigments traditionally used in commercially acceptable metal primers. Indeed, it is further taught that strontium chromate should be used in combination with aluminum pigments to provide aluminum containing paints having an anti-corrosive effect.

Aluminum pigments, especially leafing aluminums, are known to produce an apparently continuous film of aluminum metal.

Barrier pigments, especially platy or platelet pigments have been known to provide anticorrosive effects.

However, leafing aluminums and barrier pigments have traditionally been somewhat disfavored due to recoatability and/or sanding performance issues. Moreover, the anticorrosive effect of the coating post sanding can be impaired due to the removal of the barrier or leafing layer. As a result, the use of aluminum pigments in primers is to some extent disfavored.

The prior art has thus failed to provide a coating composition intended for use as a direct to metal primer which has commercially acceptable performance properties with regard to salt spray resistance, sandability, recoatability and adhesion to metal substrates, especially iron and/or steel.

Accordingly, it is an object of the invention to provide a curable coating composition that can be applied directly to a metal substrate and provides a commercially acceptable level of salt spray resistance.

It is a further object of the invention to provide a curable coating composition which has commercially acceptable performance properties with regard to direct to metal adhesion and salt spray resistance and further can be sanded without the production of environmentally disfavored dust.

It is a further object of the invention to provide a curable coating composition which has commercially acceptable performance properties with regard to direct to metal adhesion, salt spray resistance, sandability, and further can be recoated with a second application of the curable coating composition of the invention or another curable coating composition.

Finally, it is an object of the invention to provide a curable coating composition which has commercially acceptable performance properties with regard to direct to metal adhesion, salt spray resistance, sandability, and recoatability, especially a curable coating composition having a film forming component selected from the group consisting of polyurethane systems and epoxy/amine systems.

SUMMARY OF THE INVENTION

It has been found that these and other objects of the invention have been achieved with the use of a curable coating composition comprising a film-forming component selected from the group consisting of polyurethane systems and epoxy/amine systems, and a corrosion protection component consisting of aluminum selected from the group consisting of nonleafing aluminum pigments and present in an amount effective to prevent corrosion of the substrate, wherein a cured film of the coating applied to a metallic substrate has a pass rating after 480 hours in salt spray per ASTM B117, and is both sandable and recoatable.

In a preferred embodiment of the invention, the aluminum pigment will be a lamellar shaped aluminum pigment and will be present in an amount of from 0.011 to 0.051 P/B.

In a particularly preferred embodiment of the invention, the film forming component of the invention will be a polyurethane based coating system comprising a film forming polymer which is an active hydrogen containing group polymer and an isocyanate functional crosslinking agent.

In a most preferred embodiment of the invention, the polyurethane film forming component will further comprise a composition comprising (I) an effective amount of a first compound having an acid number of from 70 to 120 mg KOH/g, a hydroxyl number of from 200 to 400 mg KOH/g, a number average molecular weight of from 300 to 700, and which is the reaction product of (a) at least one difunctional carboxylic acid, (b) at least one trifunctional polyol, (c) at least one chain stopper, and (d) phosphoric acid, and (II) an effective amount of a second compound comprising a carboxy phosphate ester having the formula:

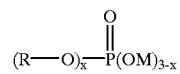

wherein R is an C5–C40 aliphatic group in which one or more aliphatic carbon atoms are substituted with lateral or terminal —COOR1 groups, wherein R1 is H, metal, ammonium, C1–C6 alkyl, or C6–C10 aryl, M is hydrogen, metal or ammonium and x is a number from 0 to 3.

DETAILED DESCRIPTION OF THE PREFERRED EMBODIMENTS

The methods of the invention utilize two-component coating compositions. As used herein, the term "two-component" refers to the number of solutions and/or dispersions which are mixed together to provide a curable coating composition. Up until the point of mixing, neither of the individual components alone provides a curable coating composition.

Once mixed, the resulting curable coating composition is applied to a substrate as quickly as possible. Typically, "as quickly as possible" means immediately after the mixing of the separate components or within eight (8) hours from the time the separate components are mixed, preferably less than one (1) hour after mixing. In a typical two-component application process the components are mixed together either (i) at the nozzle of a sprayer by the joining of two separate carrier lines at the nozzle or (ii) immediately upstream of the nozzle of a sprayer and then delivered to the nozzle via a single carrier line. Once at the nozzle, the mixture is immediately atomized into a mist which is directed at a substrate which is being coated with a film of the mixture of the two-components.

Unlike one-component compositions, two-component compositions will generally cure in the absence of elevated temperatures. The individual components (I) and (II) will react with each other upon admixture to provide a crosslinked product, most often at ambient temperatures, or more particularly at temperatures of from 15 to 60° C. and most preferably from 24 to 60° C.

The coating compositions of the invention comprise a corrosion protection component that consists essentially of, and more preferably consists of, one or more aluminum pigments. Although the composition may contain other filler and/or extender pigments such as talc, barrites, silicas and the like, such are not generally considered to substantially contribute to the salt spray resistance of cured films made from the coating compositions of the invention.

Aluminum pigments suitable for use in the instantly claimed compositions are those aluminum pigments defined as nonleafing aluminum pigments. Although the prior art has taught that the leafing aluminum pigments may be superior in regards to possible anti corrosive effects due to the formation of a barrier-like layer, it has been found that the use of nonleafing aluminum pigments is advantageous in the coating composition of the invention.

Leafing aluminum pigments have a hydrophobic nature which causes the pigments to float on the surface of water.

When placed in a coating, the flakes of leafing aluminum pigments will orientate at or near the surface of the cured film. The flakes are normally oriented in a parallel overlapping fashion and provide a continuous metallic sheath.

In contrast, nonleafing aluminum pigments are distributed evenly throughout the entire cured film. This distribution is generally attributed to the lubricants used during the aluminum pigment manufacturing process. Typically used lubricants are unsaturated fatty acids such as oleic acid.

Suitable nonleafing aluminum pigments will have flake thicknesses of from 0.1 $\mu$m to 2.0 $\mu$m and diameters of from 0.5 $\mu$m to 200 $\mu$m.

Acid-resistant grades of nonleafing aluminum pigments are particularly preferred.

In general, the corrosion protection component of the invention will be present in an amount of from 0.011 to 0.051, more preferably 0.015 to 0.045, and most preferably from 0.025 to 0.040, all being based on P/B, i.e., the % by weight based on the total nonvolatile of the film-forming component, i.e., the total nonvolatile weight of the film-forming polymer and the crosslinking agent.

Coating compositions of the invention will generally have a pass rating for 480 hour salt spray tests per ASTM B117, incorporated herein by reference. A pass rating is scribe creep of less than 3 mils along the edge of the scribe. More preferably, the coating compositions of the invention will have no more than 2 mils of adhesion loss along the scribe and most preferably will have scribe creep of from 0.5 to 1.5 mils. The coating compositions of the invention will also be free of blistering and rust spots upon completion of salt spray tests per ASTM B117.

The two-component coating composition typically comprises a film-forming component that in turn comprises a film-forming polymer or binder and a crosslinking agent. The film-forming polymer is typically in a polymer or binder component (I), while the crosslinking agent is typically in a hardener component (II).

Coating compositions of the invention may comprise any of the film-forming components used in the refinish coatings industry. Such coating compositions may rely on air dry lacquer film formation, film formation via chemical crosslinking, or a combination thereof Thermosetting films produced by chemical crosslinking are most preferred.

Thermosetting coatings of the invention will comprise at least one film-forming polymer and at least one crosslinking agent. The film-forming polymer will comprise one or more functional groups reactive with one or more functional groups on the crosslinking agent. Examples of functional group combinations useful for the production of crosslinked coatings include, but are not limited to, active-hydrogen and isocyanate, epoxide and carboxylic acid, hydroxyl/carboxylic acid and/or urea-formaldehyde/melamine-formaldehyde, epoxide and amine, and the like.

Although the film-forming polymer may contain any functional group reactive with the functional group present on the crosslinking agent, preferably the functional group present on the film-forming polymer is at least one functional group selected from the group consisting of hydroxyl, amine, carboxylic acid, epoxy and mixtures thereof. Especially preferred functional groups for use on the film-forming polymer are hydroxyl groups and amine groups, with hydroxyl groups being most preferred.

Examples of suitable film-forming polymers are acrylic polymers, polyurethane polymers, polyesters, alkyds, polyamides, epoxy group containing polymers, and the like.

Particularly preferred film-forming polymers will be difunctional, generally having an average functionality of about two to eight, preferably about two to four. These compounds generally have a number average molecular weight of from about 400 to about 10,000, preferably from 400 to about 8,000. However, it is also possible to use low molecular weight compounds having molecular weights below 400. The only requirement is that the compounds used as film-forming polymers not be volatile under the heating conditions, if any, used to cure the compositions.

More preferred compounds containing reactive hydrogen groups are the known polyester polyols, polyether polyols, polyhydroxyl polyacrylates, polycarbonates containing hydroxyl groups, and mixtures thereof In addition to these preferred polyhydroxyl compounds, it is also possible to use polyhydroxy polyacetals, polyhydroxy polyester amides, polythioether containing terminal hydroxyl groups or sulphydryl groups or at least difunctional compounds containing amino groups, thiol groups or carboxy groups. Mixtures of the compounds containing reactive hydrogen groups may also be used.

In a most preferred embodiment of the invention, the film-forming polymer reactable with the crosslinking agent is an acrylic resin, which may be a polymer or oligomer. The acrylic polymer or oligomer preferably has a number average molecular weight of 500 to 1,000,000, and more preferably of 1000 to 20,000. Acrylic polymers and oligomers are well-known in the art, and can be prepared from monomers such as methyl acrylate, acrylic acid, methacrylic acid, methyl methacrylate, butyl methacrylate, cyclohexyl methacrylate, and the like. The active hydrogen functional group, e.g., hydroxyl, can be incorporated into the ester portion of the acrylic monomer. For example, hydroxy-functional acrylic monomers that can be used to form such resins include hydroxyethyl acrylate, hydroxybutyl acrylate, hydroxybutyl methacrylate, hydroxypropyl acrylate, and the like. Amino-functional acrylic monomers would include t-butylaminoethyl methacrylate and t-butylamino-ethylacrylate. Other acrylic monomers having active hydrogen functional groups in the ester portion of the monomer are also within the skill of the art.

Modified acrylics can also be used. Such acrylics may be polyester-modified acrylics or polyurethane-modified acrylics, as is well known in the art. Polyester-modified acrylics modified with e-caprolactone are described in U.S. Pat. No. 4,546,046 of Etzell et al, the disclosure of which is incorporated herein by reference. Polyurethane-modified acrylics are also well known in the art. They are described, for example, in U.S. Pat. No. 4,584,354, the disclosure of which is incorporated herein by reference.

Polyesters having active hydrogen groups such as hydroxyl groups can also be used as the film-forming polymer in the composition according to the invention. Such polyesters are well-known in the art, and may be prepared by the polyesterification of organic polycarboxylic acids (e.g., phthalic acid, hexahydrophthalic acid, adipic acid, maleic acid) or their anhydrides with organic polyols containing primary or secondary hydroxyl groups (e.g., ethylene glycol, butylene glycol, neopentyl glycol).

Polyurethanes having active hydrogen functional groups are also well known in the art. They are prepared by a chain extension reaction of a polyisocyanate (e.g., hexamethylene diisocyanate, isophorone diisocyanate, MDI, etc.) and a polyol (e.g., 1,6-hexanediol, 1,4-butanediol, neopentyl glycol, trimethylol propane). They can be provided with active hydrogen functional groups by capping the polyurethane chain with an excess of diol, polyamine, amino alcohol, or the like.

Although polymeric or oligomeric active hydrogen components are often preferred, lower molecular weight non-polymeric active hydrogen components may also be used in some applications, for example aliphatic polyols (e.g., 1,6-hexane diol), hydroxylamines (e.g., monobutanolamine), and the like.

Examples of suitable crosslinking agents include those compounds having one or more functional groups reactive with the functional groups of the film-forming polymer. Examples of suitable crosslinking agents include isocyanate functional compounds and aminoplast resins, epoxy functional compounds, acid functional compounds and the like. Most preferred crosslinkers for use in the coating compositions of the invention are isocyanate functional compounds.

Suitable isocyanate functional compounds include polyisocyanates that are aliphatic, including cycloaliphatic polyisocyanates, or aromatic. Useful aliphatic polyisocyanates include aliphatic diisocyanates such as ethylene diisocyanate, 1,2-diisocyanatopropane, 1,3-diisocyanatopropane, 1,6-diisocyanatohexane, 1,4-butylene diisocyanate, lysine diisocyanate, hexamethylene diisocyanate (HDI), 1,4-methylene bis-(cyclohexylisocyanate) and isophorone diisocyanate. Useful aromatic diisocyanates include the various isomers of toluene diisocyanate, meta-xylenediisocyanate and para-xylenediisocyanate, also 4-chloro-1,3-phenylene diisocyanate, 1,5-tetrahydro-naphthalene diisocyanate, 4,4'-dibenzyl diisocyanate and 1,2,4-benzene triisocyanate can be used. In addition, the various isomers of alpha.,.alpha.,.alpha.',.alpha.'-tetramethyl xylene diisocyanate can be used..

In a most preferred embodiment, the crosslinking agent will comprise one or more components selected from the group consisting of hexamethylene diisocyanate (HDI), the isocyanurates of HDI, the biurets of HDI, and mixtures thereof, with the isocyanurates and biurets of HDI being particularly preferred.

Suitable isocyanate functional compounds may be unblocked, in which case the coating composition should be utilized as a two component system, i.e., the reactive components combined shortly before application, or they may be blocked. Any known blocking agents, such as alcohols or oximes, may be used.

In a most preferred embodiment of the coating compositions of the invention, the coating composition will be a two-component system with the reactive film forming polymer and the crosslinking agent combined shortly before application. In such an embodiment, the most preferred coating composition of the invention comprising the mixture of compounds (I) and (II) will be preferably incorporated with the film-forming polymer containing component.

Hardener component (II) may also comprise one or more solvents. In a preferred embodiment, component (II) will include one or more solvents. Suitable solvents and/or diluents include aromatics, napthas, acetates, ethers, esters, ketones, ether esters and mixtures thereof.

Additives, such as catalysts, pigments, dyes, leveling agents, and the like may be added as required to the coating compositions of the invention.

In a most preferred embodiment of the invention, the coating compositions of the invention will further comprise an adhesion enhancing composition comprising a mixture of a first compound (I) and a second compound (II), wherein compound (I) and compound (II) cannot be the same. It has unexpectedly been found that the combination of compounds (I) and (II) provides an improvement in refinish adhesion, i.e., the adhesion of a refinish coating to a bare exposed metal substrate, which is better than that obtained with the use of either compound (I) or compound (II) alone.

Compound (I) is a low molecular weight polyester compound having both acid and hydroxyl functionality. It will generally have a number average molecular weight in the range of from 150 to 3000, preferably from 300 to 1000, and most preferably from 400 to 600. Compound (I) will generally have a polydispersity of from 1.00 to 2.00, with a polydispersity of 1.50 being most preferred.

Suitable compounds (I) will also have an acid number in the range of from 70 to 120 mg KOH/g, preferably from 70 to 100 mg KOH/g, and most preferably from 70 to 80 mg KOH/g.

In addition, suitable compounds (I) will have a hydroxyl number in the range of from 200 to 400 mg KOH/g, more preferably from 300 to 400 mg KOH/g and most preferably from 330 to 360 mg KOH/g.

Compound (I) generally comprises the reaction product of the reaction of (a) at least one difunctional carboxylic acid, (b) at least one trifunctional polyol, (c) at least one chain stopper, and (d) phosphoric acid.

Examples of suitable difunctional carboxylic acids (a) include adipic acid, azeleic acid, fumaric acid, phthalic acid, sebacic acid, maleic acid, succinic acid, isophthalic acid, tetrahydrophthalic acid, hexahydrophthalic acid, dimer fatty acids, itaconic acid, glutaric acid, cyclohexanedicarboxylic acid, and mixtures thereof. Preferred difunctional carboxylic acids (a) are adipic acid and azeleic acid. Adipic acid is most preferred for use as difunctional carboxylic acid (a).

The at least one trifunctional polyol (b) may be branched or unbranched, but branched trifunctional polyols are preferred. Examples of suitable trifunctional polyols (b) are trimethylolpropane, trimethylol ethane, glycerin, 1,2,4-butanetriol, and mixtures thereof. Preferred trifunctional polyols (b) are trimethylolpropane and trimethylol ethane, with trimethylolpropane being a most preferred trifunctional polyol (b).

The at least one chain stopper will generally be a carboxylic acid that is different from the at least one difunctional carboxylic acid (a). Monocarboxylic acids are preferred. Suitable carboxylic acids (c) will preferably contain one or more aromatic structures and will preferably contain some branched alkyl groups. Examples of suitable carboxylic acids (c) include para-t-butyl benzoic acid, benzoic acid, salicylic acid, 2-ethylhexanoic acid, pelargonic acid, isononanoic acid, $C_{18}$ fatty acids, stearic acid, lauric acid, palmitic acid, and mixtures thereof. Preferred carboxylic acids (c) include para-t-butyl benzoic acid, benzoic acid, and 2-ethylhexanoic acid, with para-t-butyl benzoic acid being most preferred.

Phosphoric acid (d) should be added to the reaction mixture in an amount of from 0.03 to 0.20, preferably from 0.05 to 0.15, and most preferably from 0.07 to 0.10. It will be appreciated that while phosphoric acid is most preferred, phosphate esters such as butyl or phenyl acid phosphate and the like are suitable for use as component (d) in the preparation of compound (I).

Polymerization of the reactants may occur at typical esterification conditions, i.e., 200–230° C. reaction temperature while continuously removing water as a reaction by-product. Solvents that facilitate the removal of water from the reaction system (those that form an azeotrope) such as xylenes, may be used.

Reactants (a), (b), (c) and (d) will generally be used in a molar ratio of 4.2:4.9:0.01:0.0005 to 5.1:5.6:0.7:0.005, preferably from 4.4:5.0:0.02:0.0008 to 5.0:5.5:0.6:0.003, and most preferably from 4.8:5.2:0.02:0.0009 to 4.9:5.4:0.06:0.002.

A commercially available and most preferred example of compound (I) is Borchigen HMP, commercially available from the Wolff Walsrode division of the Bayer Corporation of Burr Ridge, Ill., U.S.A.

Compound (II) comprises a carboxy phosphate ester having the formula:

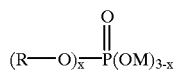

wherein M is hydrogen, metal or ammonium, x is a number from 0 to 3, and R is a saturated or unsaturated $C_5$–$C_{40}$ aliphatic group in which one or more of the aliphatic carbon atoms can be substituted or replaced with a halogen atom (such as fluorine or chlorine), a $C_1$–$C_6$ alkyl group, a $C_1$–$C_6$ alkoxy group, a $C_6$–$C_{10}$ aromatic hydrocarbon group, preferably phenyl or naphthyl, or a $C_6$–$C_{10}$ aromatic hydrocarbon group that is substituted with one or more (preferably 1 to 3) $C_1$–$C_6$ alkyl groups or —$COOR^1$ groups wherein $R^1$ is H, metal, ammonium, $C_1$–$C_6$ alkyl, or $C_6$–$C_{10}$ aryl, or mixtures thereof.

In preferred compounds (II), R will contain one or more $C_6$–$C_{10}$ aromatic hydrocarbon groups, and most preferably, one or more $C_6$–$C_{10}$ aromatic hydrocarbon groups which contain one or more, preferably at least two, —$COOR^1$ groups wherein $R^1$ is H, metal, ammonium, $C_1$–$C_6$ alkyl, or $C_6$–$C_{10}$ aryl.

In a most preferred compound (II), R will contain at least one $C_6$–$C_{10}$ aromatic hydrocarbon group and at least two —$COOR^1$ groups wherein $R^1$ is H, metal, ammonium, $C_1$–$C_6$ alkyl, or $C_6$–$C_{10}$ aryl. $R^1$ will most preferably be a $C_1$–$C_6$ alkyl or a $C_6$–$C_{10}$ aryl group.

The —$COOR^1$ groups may be lateral or terminal. It will be appreciated that when $R^1$ is H, compound (II) will comprise one or more free carboxylic acid groups. Similarly, when $R^1$ is a metal or ammonium ion, compound (II) will have one or more carboxylic acid salt groups. Finally, when $R^1$ is a $C_1$–$C_6$ alkyl or a $C_6$–$C_{10}$ aryl, compound (II) will comprise one or more ester groups.

It will be appreciated that suitable compounds (II) can and most preferably will comprise mixtures of compounds having the formula:

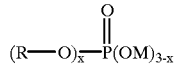

wherein R, M, x, and $R^1$ are as described above. However, in a most preferred embodiment, such a mixture will contain one or more molecules having the above structure wherein x is 1 or 2, preferably 1, R has at least one $C_6$–$C_{10}$ aromatic hydrocarbon group substituted with at least one, preferably two, —$COOR^1$ groups wherein $R^1$ is H or a $C_1$–$C_6$ alkyl or $C_6$–$C_{10}$ aryl, most preferably a $C_1$–$C_6$ alkyl, and M is H.

Compound (II) will generally have a number average molecular weight in the range of from 600 to 1200, preferably from 700 to 900, and most preferably from 750 to 850. Compound (II) will generally have a polydispersity of from 1.00 to 2.00, with a polydispersity of 1.00 to 1.50 being preferred and a polydispersity of 1.15 to 1.35 being most preferred.

Suitable compounds (II) will also have an acid number in the range of from 50 to 200 mg KOH/g, preferably from 100 to 180 mg KOH/g, and most preferably from 120 to 160 mg KOH/g. In addition, suitable compounds (II) will have a hydroxyl number in the range of from 100 to 250 mg KOH/g, preferably from 120 to 230 mg KOH/g, and most preferably from 150 to 200 mg KOH/g.

Suitable compounds (II) generally comprise the reaction product of (a) at least one difunctional polyol, (b) phosphoric acid, and (c) at least one trifunctional carboxylic acid.

Examples of suitable difunctional polyols (a) include neopentanediol, ethylene glycol, diethylene glycol, propylene glycol, dipropylene glycol, hydrogenated bisphenol A, 1,6-hexanediol, hydroxypivalylhydroxypivalate, cyclohexanedimethanol, 1,4-butanediol, 2-ethyl-1,3-hexandiol, 2,2,4-trimethyl-1,3-pentandiol, 2-ethyl-2-butyl-1,3-propanediol, 2-methyl-1,3-propanediol, and mixtures thereof. Preferred difunctional polyols (a) are neopentane diol and 2-ethyl-2-butyl-1,3-propanediol, with neopentane diol being most preferred.

The at least one trifunctional carboxylic acid (c) may be aromatic or aliphatic in nature, but aromatic containing structures are most preferred. Examples of suitable trifunctional carboxylic acids are trimellitic acid, 1,3,5-benzenetricarboxylic acid, citric acid, and mixtures thereof. Preferred trifunctional carboxylic acids are 1,3,5-benzenetricarboxylic acid and trimellitic acid, with trimellitic acid being most preferred.

Phosphoric acid (c) is as described above with respect to (I(d)).

Polymerization of the reactants (a), (b), and (c) may occur at typical esterification conditions, i.e., 200–230° C. reaction temperature while continuously removing water as a reaction by-product. Solvents that facilitate the removal of water from the reaction system (those that form an azeotrope) such as xylenes, may be used. The reaction can also be subsequently admixed with suitable solvents.

Reactants (a), (b), and (c) will generally be used in a ratio of 6.3:3.0:0.05 to 7.9:4.0:0.15, preferably from 6.7:3.2:0.07 to 7.6:3.8:0.12, and most preferably from 6.9:3.3:0.09 to 7.3:3.5:0.11.

A commercially available and most preferred example of compound (II) is LUBRIZOL™ 2063, available from the Lubrizol Corp of Wickliffe, Ohio.

Compound (I) will typically comprise from 50 to 80% by weight of the mixture of compound (I) and compound (II), preferably from 60 to 75% by weight, and most preferably from 65 to 70% by weight, based on the total weight of the mixture of compound (I) and compound (II). Compound (II) will comprise from 20 to 50% by weight of the mixture of compound (I) and compound (II), preferably from 25 to 40% by weight, and most preferably from 30 to 35% by weight, based on the total weight of the mixture of compound (I) and compound (II).

The composition comprising the mixture of compound (I) and compound (II) will typically be present in a coating composition in an amount of from 0.10 to 1.00% by weight, preferably from 0.10 to 0.30%, and most preferably from 0.15 to 0.25% by weight, based on the total nonvolatile weight of the coating composition.

The mixture of compound (I) and compound (II) may incorporated into finished coating compositions by conventional mixing techniques using mixing equipment such as a mechanical mixer, a cowles blade, and the like. Although the additives may be added during the manufacturing process or subsequently to a finished coating, those skilled in the art will appreciate that in a most preferred embodiment, the additives will be added post grind during the manufacturing process. Although the mixture of compound (I) and compound (II) may be used in single or two component systems, use in two-component systems is preferred, particularly where the mixture of compounds (I) and (II) is placed in the resin component of a two component system.

Finally, although a variety of packaging options are suitable for containing the coating compositions of the invention, it is most preferred that coating compositions containing the mixture of compounds (I) and (II) be packaged in epoxy or phenolic lined cans. Packaging in such containers has been found to ensure the retention of optimum adhesion characteristics.

The mixture of compound (I) and compound (II) when used in coating compositions provides improved adhesion of the coating composition to bare untreated metal substrates, including aluminum and galvanized steel substrates.

The coating compositions of the invention may be stored as such for prolonged periods at room temperature without gel formation or undesirable changes. They may be diluted as required to a suitable concentration and applied by conventional methods, for example, spraying or spread coating, and cured by exposure to ambient temperatures of from 70 to 75° F. for a period of from 1 to 3 hours, preferably from 1.5 to 2 hours. However, sandable films of the coating compositions of the invention comprising mixtures of compounds (I) and (II) may also be obtained upon exposure of the applied coating to temperatures in the range of from at least 120° F., more preferably up to 140° F., for periods of from 30 to 50 minutes, preferably from 30 to 40 minutes.

What is claimed is:

1. A sandable and recoatable two-component coating composition for preventing corrosion of a metallic substrate, the composition comprising
    a film-forming component comprising
        a polymer component (I) comprising a film-forming polymer having functional groups selected from the group consisting of active hydrogen containing groups, epoxide groups, and mixtures thereof, and
        a hardener component (II) comprising a crosslinking agent having functional groups selected from the group consisting of isocyanate groups and amine groups, and
    a corrosion protection component consisting essentially of aluminum selected from the group consisting of nonleafing aluminum pigments and which is present in an amount of from 0.011 to 0.051 weight percent, based on the total nonvolatile film-forming component of the coating composition,
wherein a cured film of the coating composition applied to a metallic substrate has a pass rating after 480 hours in salt spray per ASTM B117, and is both sandable and recoatable.

2. The coating composition of claim 1 wherein the film-forming component comprises a film forming polymer comprising an active hydrogen group containing polymer and an isocyanate functional crosslinking agent.

3. The coating composition of claim 1 wherein the film-forming component comprises an epoxy functional film forming polymer and an amine functional crosslinking agent.

4. The coating composition of claim 1 which is a two component coating composition wherein the film-forming polymer is in a polymer component (I) and the crosslinking agent is in a hardener component (II).

5. The coating composition of claim 1 wherein the corrosion protection component is present in an amount of from 0.015 to 0.045 weight percent, based on the total nonvolatile film-forming component of the coating composition.

6. The coating composition of claim 5 wherein the corrosion protection component is present in an amount of from 0.020 to 0.040 weight percent, based on the total nonvolatile film-forming component of the coating composition.

7. The coating composition of claim 1 wherein the corrosion protection component is a lamellar shaped aluminum pigment.

8. The coating composition of claim 1 wherein the film-forming component further comprises
    (I) a first compound having an acid number of from 70 to 120 mg KOH/g, a hydroxyl number of from 200 to 400 mg KOH/g, a number average molecular weight of from 150 to 3000, and which is the reaction product of (a) at least one difunctional carboxylic acid, (b) at least one trifunctional polyol, (c) at least one chain stopper, and (d) phosphoric acid, and
    (II) a second compound comprising one or more carboxy phosphate esters having the formula:

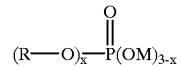

wherein M is hydrogen, metal, or ammonium, x is a number from 0 to 3, R is an $C_5$–$C_{40}$ aliphatic group having one or more —$COOR^1$ groups, wherein $R^1$ is H, metal, ammonium, $C_1$–$C_6$ alkyl, or $C_6$–$C_{10}$ aryl.

9. The coating composition of claim 4 wherein polymer component (I) and hardener component (II) are separated up to at least 10 hours before a first use of a mixture of said first and second components.

10. The coating composition of claim 9 wherein the corrosion protection component is in the polymer component (I).

11. A method of preventing corrosion of a metallic substrate, comprising
    providing a two-component coating composition comprising
        a film-forming component comprising
            a polymer component (I) comprising a film-forming polymer having functional groups selected from the group consisting of active hydrogen containing groups, epoxide groups, and mixtures thereof, and
            a hardener component (II) comprising a crosslinking agent having functional groups selected from the group consisting of isocyanate groups and amine groups, and
        a corrosion protection component consisting essentially of aluminum selected from the group consisting of nonleafing aluminum pigments and which is present in an amount of from 0.011 to 0.051 weight percent, based on the total nonvolatile film-forming component of the coating composition,
    mixing component (I) and component (II) together to from a mixed coating composition,
    applying the mixed coating composition to a metallic substrate, and
    curing the applied mixed coating composition to provide a coated metallic substrate, wherein the coated metallic substrate has a pass rating after 480 hours in salt spray per ASTM B117 and is sandable and recoatable.

12. A method of making a multilayer coating system, comprising
    providing a two-component primer coating composition comprising
        a film-forming component comprising
            a polymer component (I) comprising a film-forming polymer having functional groups selected from the group consisting of active hydrogen containing groups, epoxide groups, and mixtures thereof, and a hardener component (II) comprising a crosslinking agent having functional groups selected from the group consisting of isocyanate groups and amine groups, a corrosion protection component consisting essentially of aluminum selected from the group consisting of nonleafing aluminum pigments and which is present in an amount of from 0.011 to 0.051 weight percent, based on the total nonvolatile film-forming component of the coating composition, mixing component (I) and component (II) together to form a mixed primer composition, applying the mixed primer composition directly to a metal substrate to provide a coated metallic substrate, curing the coated metallic substrate to provide a primed metallic substrate which is both sandable and recoatable, applying to the primed metallic substrate one or more additional coating compositions, and curing the one or more additional coating compositions to provide a cured multilayer coating system.

* * * * *